Sept. 16, 1958 R. W. ROSSELLE 2,852,152
TRAILERS
Filed July 19, 1957 4 Sheets-Sheet 2
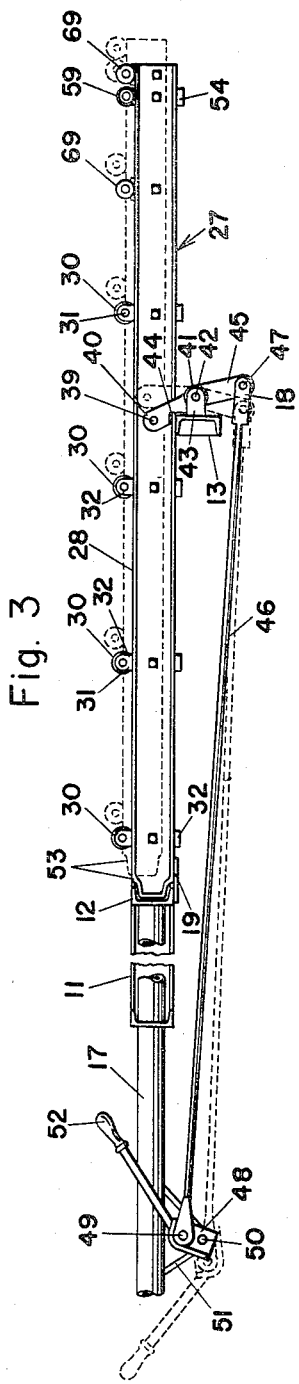
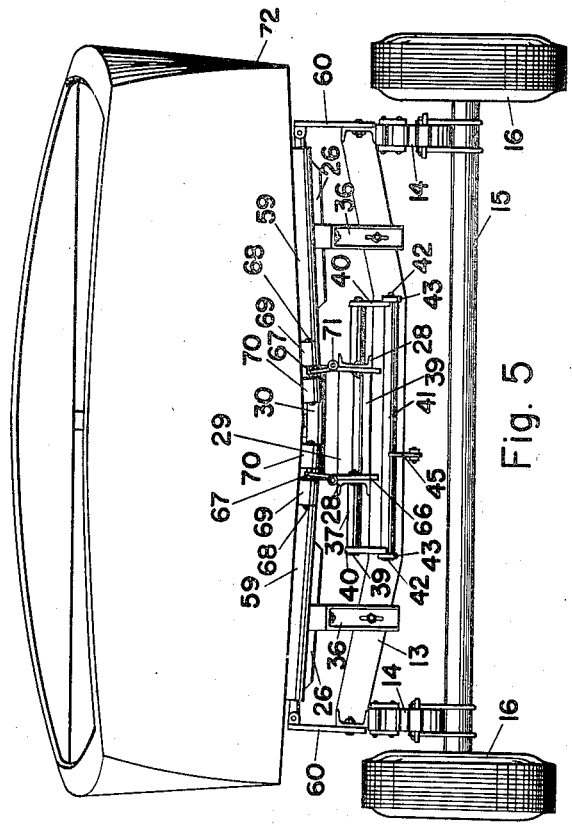
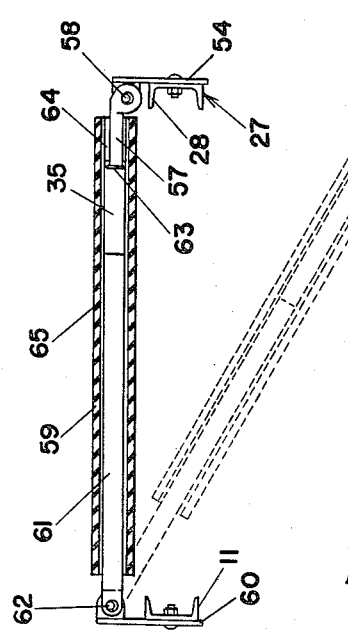
INVENTOR.
ROBERT W. ROSSELLE
BY
Salvatore G. Militano,
ATTORNEY

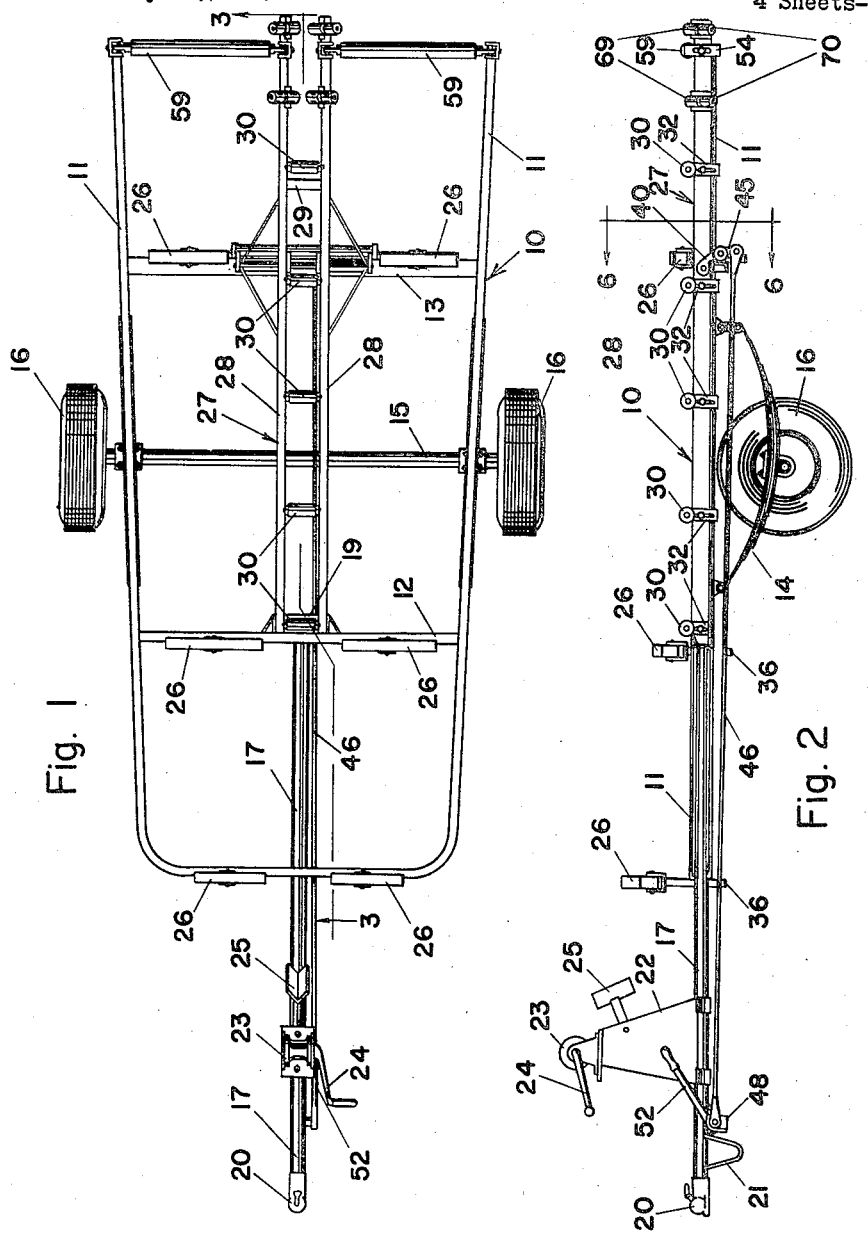

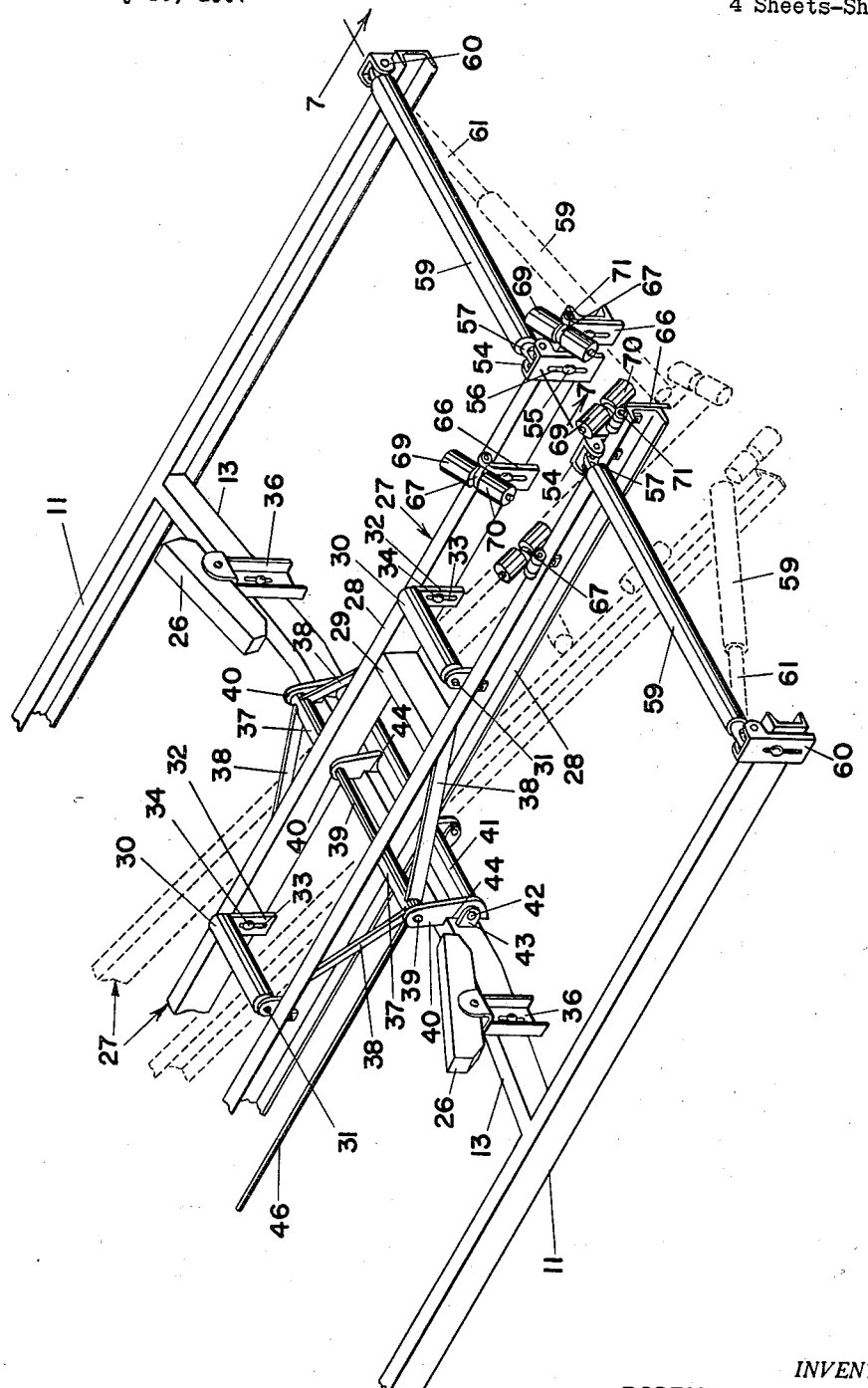

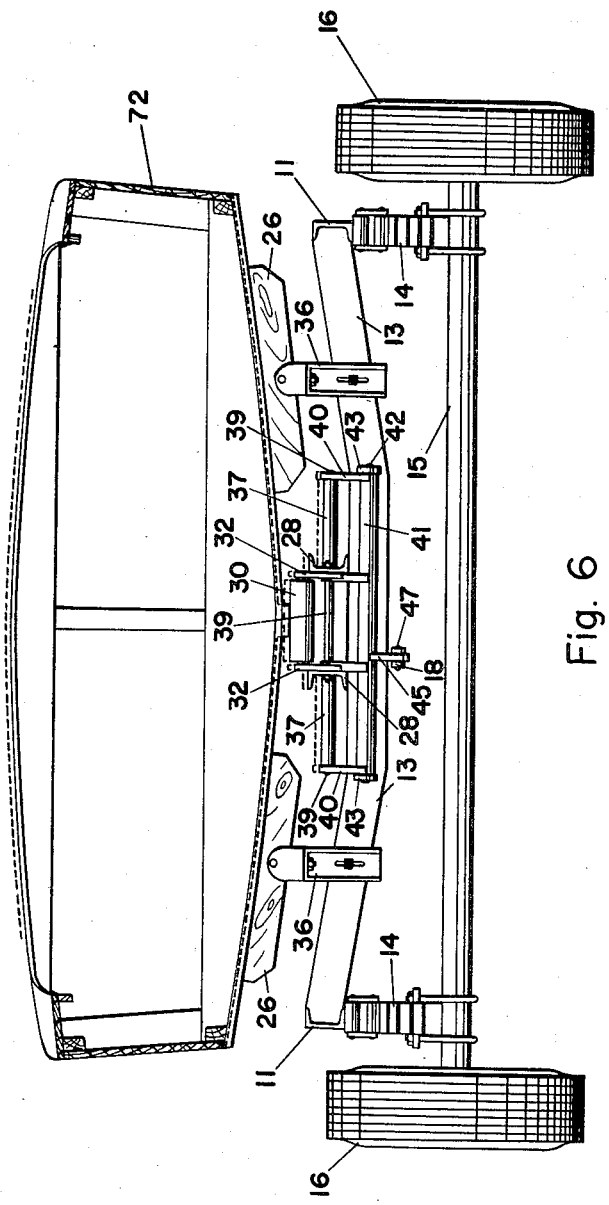

United States Patent Office 2,852,152
Patented Sept. 16, 1958

2,852,152

TRAILERS

Robert W. Rosselle, Miami, Fla.

Application July 19, 1957, Serial No. 673,021

6 Claims. (Cl. 214—505)

This invention relates generally to trailers and is more particularly directed to boat trailers, but not limited thereto.

A principal object of the present invention is to provide a trailer with a pivoted ramp at whose extreme rear end portion a pair of telescoping rollers are connected upon which a boat will roll as the rollers maintain contact with the changing curvature of a boat bottom.

Another object of the present invention is to provide a boat trailer having rollers which automatically center the boat on the trailer from the moment the bow of the boat is received by the rear end portion of the trailer until the boat has been completely pulled onto the trailer and likewise when a boat is being launched.

A further object of the present invention is to provide a boat trailer described as above wherein after the boat has been positioned on the trailer, the roller carrying ramp is lowered with relation to the trailer and the boat is then made to rest on boat supporting chocks.

A still further object of the present invention is the provision of a boat trailer described as above wherein the rollers support the boat completely and adequately at all times until the chocks are brought into contact with the boat.

A still further object of the present invention is to provide a boat trailer wherein a large boat is merely floated to the trailer, a winch line secured to the bow and the boat may then be pulled onto rollers mounted on the trailer without the necessity of bodily lifting the bow or any other part of the boat on the trailer.

A still further object of the present invention is to provide a boat trailer that is easily handled by a single person to mount or launch a large boat under varied conditions of wind and sea.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes of modifications mark no material departure from the salient features of the invention as expressed in the appended claims.

In the drawings:

Figure 1 is a top plan view of a boat trailer embodying my invention.

Figure 2 is a vertical cross sectional view taken along approximately the longitudinal axis of the trailer.

Figure 3 is a fragmentary detailed view in elevation showing the operation of the ramp.

Figure 4 is a fragmentary perspective view thereof with the dotted lines showing the ramp in its extreme pivoted position.

Figure 5 is a rear elevational view of the trailer with a boat shown in position thereon.

Figure 6 is a sectional view taken along the line 6—6 of Figure 2.

Figure 7 is a sectional view taken along the line 7—7 of Figure 4.

Referring to the drawings wherein like numerals are used to designate similar parts throughout the several views, the numeral 10 refers to my boat trailer generally consisting of a framework 11 of channel beams forming a somewhat rectangular shape with cross beams 12 and 13 as strengthening members, the cross beam 13 being positioned forwardly of the rear portion of the frame 11. The frame 11 is mounted on a pair of conventional springs 14 which are secured to an axle 15 having wheels 16 rotatably mounted thereon.

At the forward portion of the framework 11 there is a tongue 17 mounted on the longitudinal axis thereof extending from the front beam 12 to which the tongue is welded or otherwise secured and terminating a distance forward of the frame 11.

At the free end of the tongue 17 is a conventional coupling hitch 20 for securing the boat trailer to a companion hitch on a motor vehicle that is to tow or pull the trailer 10. Adjacent the coupling hitch 20 and welded to the underside of the tongue 17 is a stand 21 upon which the tongue 17 rests in a lowered position when not connected to a hitch for towing.

Mounted rearwardly of the stand 21 on the upper surface of the tongue 17 is an upright support 22 on top of which is mounted a hand operated winch 23 provided with a handle 24 for operating the winch 23. Also mounted on the support 22 is a stem chock 25 which faces rearwardly for receiving the bow of a boat that has been placed on the trailer 10. Also mounted on the frame 11 and the cross beams 12 and 13 are conventional chocks 26 upon which the boat rests after the boat has been drawn onto the trailer 10. Since the chocks 26 are conventional they are shown for illustrative purposes only, therefore any desired design or number of such chocks 26 may be used.

Means are provided for facilitating the placing a boat on the trailer 10 or launching same, which means form the essence of the present invention, comprising a ramp 27 pivotally mounted on the cross beam 13 as is explained in greater detail hereinafter, and extending from the cross beam 12 rearwardly of the trailer 10 along the longitudinal axis of the trailer 10. The ramp 27 consists of a pair of parallel disposed channel beams 28 secured together by a plurality of relatively short cross beams 29, the rear-most cross beam 29 being spaced from the extreme rear end of the ramp 27 as best shown by Figures 1 and 4. A plurality of rollers 30 are rotatably mounted on roller shafts 31 which bridge the ramp 27 and are elevated thereabove and mounted on vertically adjustable supports 32 that are secured to the inner walls of the channel beams 28. The supports 32 are each provided with an elongated slot 33 through which a bolt 34 extends securing the supports 32 to the channel beams 28.

At the position of the cross or saddle beam 13 of the ramp 27, a ramp pivot shaft housing 37 has one end welded or otherwise secured to the side wall of each of the channel beams 28 extending outwardly therefrom with their free ends supported by tie braces 38, 38. A ramp pivot shaft 39 is positioned within the housings 37 extending through bores (not shown) in the channel beams 28 and through bores at the upper ends of a plurality of links or levers 40 whose lower ends are secured to a lift shaft housing 41.

The lift shaft housing 41 is rotatably mounted on a lift shaft 42 whose ends extend through bores in lugs 43 mounted on the rear wall of the saddle beam 13. As best shown by Figure 3, the links or levers 40 are each slotted as at 44 on their forward edge portion to permit the links to swing forwardly to a position beyond a vertical plane passing through the shaft 42. Thus allowing ramp beams 28 to rest on cross beam 13 depending from the lower portion of the shaft housing 41 at approximately its mid-section is a lug 45 at whose free end a lifting rod 46 is pivotally secured as at 47. The rod 46 extends from pivot pin 47 and adjustable yoke 18 forwardly below the tongue 17 to a pivot plate 48 where the end of the rod 46 is pivoted as at 49. The other end of the pivot plate is pivoted by a pivot pin 50 on a lug 51 secured to the lower wall of the tongue 17. A handle 52 is secured to the pivot plate 48 for pivoting the plate member 48 on the pivot pin 50.

By swinging the lifting handle 52 (counterclockwise) from the solid line to the dotted line position as shown by Figure 3, the pivot plate 48 will pivot on the pivot pin 50 thereby swinging the lifting rod 46 forwardly and compelling the shaft housing lug 45 and the housing 41 to rotate in a clockwise direction. The lever arms 40 will swing about the lift shaft 42 in a clockwise direction describing an ascending arc. The ramp 27 likewise swings a slight distance to the rear of the trailer 10 and also upwardly to the dotted line position shown by Figure 3. The forward end 53 of the ramp 27 which had been previously engaged by the channel flanges of the cross beam 12 has now slid rearwardly until the end 53 of the ramp 27 has cleared the channel flanges of cross beam 12 as shown by the dotted line position. Now, the ramp 27 has been lifted a short distance and is free to pivot on its shaft 39.

Along the inner surface of each of the channel beams 28 adjacent the rear end portion of the ramp 27 is an adjustable bracket 54 secured by means of a bolt 55 extending through an elongated slot 56 in the bracket 54. The adjustable brackets 54 are provided with a pair of spaced apart ears in which a pivot arm 57 is pivotally mounted as by a pivot pin 58 extending therebetween. The pivot arms 57 are secured at their free ends to the ends of a hollow telescoping roller 59 which extend transversely to the frame or channel members 11 of the trailer 10. As best shown by Figure 7, the free end of the pivot arm 57 is enlarged as at 63 which abuts against a bearing 64 welded or otherwise secured to the end of the telescoping roller 59. This structure permits the free rotational movement of the telescoping roller 59. The roller 59 may be covered by a fabric or rubber covered material 65 in order to protect the hull of a boat in contact therewith.

Mounted on the ends of the channel members 11 are adjustable brackets 60 identical in construction to the adjustable brackets 54 having one end of a rod 61 pivotally mounted by a pivot pin 62 thereto. The rods 61 are each telescopically mounted within the telescoping rollers 59 so that as the ramp 27 pivots about the pivot shaft 39, the rear end portion of the ramp 27 will descend and the rods 61 will slide a short distance within the telescoping tubes 59.

On each side of the bracket 54 is a pair of opposed adjustable brackets 66 secured to the channel beams 28 of the ramp 27 in the same fashion as bracket 54. A pivot arm 67 is pivotally mounted on one end to the bracket 66 by a pivot pin 71 and having its other end secured to the mid-portion of a stub shaft 68 on which V rollers 69 and 70 are rotatably mounted. The V rollers 69 and 70 are made of or covered with fabric, rubber, etc., for the same reason as the telescoping rollers 59. Because the lower pivot shaft 71 of pivot arm 67 is eccentrically mounted, the V rollers 69 and 70 will be compelled into an approximately vertical position where it normally remains as shown by Figure 4. However, when a boat is being drawn on the trailer 10 or removed therefrom, the V rollers 69 and 70 will pivot about their pivot pins 71 to conform to the shape of the hull of the boat. Since the curvature of a hull of a boat changes along its length, the V rollers 69 and 70 are constantly being swung about their pivot pins 71. The opposed pair of V rollers 69, 70 serve to center the bow of a boat when it (the boat) is first drawn into contact with the trailer 10 and assists in maintaining the boat centrally thereon.

When a boat is properly mounted on the trailer 10, it will be resting on the chocks 26 with the bow of the boat resting in the stem chock 25 and held tightly thereagainst by a line which is wound on the winch 23 and its end secured to a towing eye mounted on the bow of the boat. Also, several straps or lines tie the boat down to the trailer 10. Upon arrival at the desired place to launch the boat, the trailer 10 is backed down to the water's edge in a location where the water is sufficiently deep as to permit the boat to float therein. All straps and lines are first removed then the lifting handle 52 is swung forwardly from the solid line to the dotted line position as shown by Figure 3. The shaft housing 41 along with the links 40 will rotate in a clockwise direction shifting the ramp 27 rearwardly and upwardly. The rearward movement of the ramp 27 will disengage the forward end 53 of the ramp 27 from the cross beam 12 and raise the ramp 27 whereby the boat is lifted off the chocks 26 and the total weight of the boat is now being borne by the ramp rollers 30, the V rollers 69, 70 and the telescoping rollers 59, 59. The handle 24 of the winch 23 is turned so as to unwind the line connected to the bow of the boat. Since the trailer 10 is on a decline as exists on a shore, gravity will cause the boat to move rearwardly on the ramp rollers 30, V rollers 69, 70 and telescoping rollers 59. Using the winch as a brake, the boat 72 moves rearwardly slowly until the ramp begins to pivot or tilt on its shaft 39, the telescoping rollers 59 withdrawing outwardly of the rods 61 until the extreme rear end of the ramp is fully depressed. The telescoping rollers 59 both guide and support the boat as it rolls rearwardly. The rollers 59 maintain the boat centrally on the trailer 10 and at all times conform to the changing curvature of the hull. When the boat is about to leave the trailer 10, the V rollers 69, 70 continue to engage the sides of the bow, supporting the boat while the stern of the boat is in the water. After the boat 72 leaves the trailer 10, the winch line is disconnected from the bow of the boat. The ramp will now pivot on its shaft 39 back to its horizontal position with the forward end 53 resting on stop plate 19. The handle 52 is swung rearwardly causing the ramp 27 to swing in the opposite direction as previously described causing the forward end 53 of the ramp 27 to slide on the ramp stop plate 19 and lock into the channel flanges of cross beam 12. The trailer may now be towed away until needed to receive the boat.

When it is desired to position the boat on the trailer 10, the trailer is again placed rearwardly on the water's edge. The handle 52 is again swung forwardly to shift the ramp 27 upwardly and out of its locked position as explained hereinabove to permit the ramp 27 to be free to pivot about its shaft 39. As the bow of the boat is brought into position between the rearmost pair of V rollers 69, 70 the winch line is attached to the bow of the boat and the winch is operated to place tension on the line bringing the boat into contact with the V rollers 69, 70. Further tension on the winch line will cause the hull of the boat to enter on the ramp 27 between the V rollers 69, 70 and cause the rear portion of the ramp 27 to swing downwardly about the shaft 39 and the V rollers 69, 70 will now conform to the shape of the hull; the V rollers 69, 70 and telescoping rollers 59, will force the boat to position itself centrally on the ramp 27. As the boat is pulled forwardly by operation of the winch 23, the keel of the boat will ride on the ramp rollers 30, so that the ramp rollers 30 now assist the V rollers 69, 70 and telescoping rollers 59, to support the bottom and keel of the boat.

As the boat is being pulled forwardly on the ramp 27, the telescoping rollers 59 will center the boat on the trailer and when the center of gravity of the boat is sufficiently forward on the ramp 27, the ramp 27 will pivot about its shaft 39 until the ramp has assumed its horizontal dotted line position as shown by Figure 3. Further tension on the winch line will slide the boat forwardly along the keel rollers 30, V rollers 69, 70 and telescoping rollers 59 until the bow of the boat is received by and tightly held against the stem chock 25. The lifting handle 52 is now swung rearwardly causing the ramp 27 to become lowered and simultaneously shifted forwardly to compel the forward end 53 to become locked by the cross beam 12. The boat which had just previously been riding on the rollers now rests on the chocks 26. The weight of the boat now is borne by the chocks 26 and partially supported by all rollers.

It is to be noted that the chocks 26 are mounted on adjustable supports 36 so that if it is desired, some of the weight of the boat may be distributed onto the aforementioned rollers and some on the chocks 26. Also, the chocks 26 may themselves be pivoted rollers that operate as rollers when the boat is being launched and positioned on the trailer and as chocks when the boat is secured on the trailer. Removable chocks may be utilized on the trailer 10 if desired.

The boat shown in the accompanying drawings is an outboard motor boat and is shown only to illustrate the effective operation of the trailer 10. An inboard motor boat may be carried by the trailer 10 and just as readily launched and mounted as described in connection with the boat shown. The shaft of an inboard motor will enter between the channel beams 28 at the position of the opposed V rollers 69, 70.

What I claim as new is:

1. A device of the class described comprising support means, ramp means pivotally mounted on said support means, roller means having one end secured to said ramp means and extending in the direction of said support means and telescoping means slidably mounted in said roller means secured at one end to said support means whereby upon the pivotal movement of said ramp means said roller means will slide along said telescoping means.

2. A device of the class described comprising support means having a mid-portion, ramp means pivotally mounted on said support means along said mid-portion, roller means mounted on said ramp means and extending in substantially opposite directions toward said support means and telescoping means slidably mounted along each of said roller means and secured at one end to said support means.

3. A device of the class described comprising support means having a longitudinal axis, ramp means, means pivotally mounting said ramp means on said support means, said ramp means lying along said longitudinal axis, a plurality of rollers mounted on said ramp means transversely of said longitudinal axis, a plurality of roller means mounted on said ramp means and extending in opposed directions toward said support means, telescoping means slidably mounted along each of said roller means and secured at one end to said support means, and means operatively connected to said pivotal means for raising and lowering said ramp means with relation to said support means.

4. A device of the class described comprising support means having a longitudinal axis, ramp means, means pivotally mounting said ramp means on said support means, said ramp means lying along said longitudinal axis, a plurality of rollers mounted on said ramp means transversely of said longitudinal axis, a plurality of roller means mounted on said ramp means and extending in opposed directions toward said support means, telescoping means slidably mounted along each of said roller means and secured at one end to said support means, means operatively connected to said pivotal means for raising and lowering said ramp means with relation to said support means, and locking means mounted on said support means for securing said ramp means against pivotal movement when said ramp means is in a lowered position.

5. A trailer comprising a support frame having a pair of longitudinally disposed members, a plurality of cross members secured at their end portions to said longitudinal members, a pair of lugs mounted on one of said cross members, a shaft extending between said lugs, a housing rotatably mounted on said shaft a plurality of lever arms extending upwardly and forwardly from said housing, a ramp having a pair of spaced apart longitudinally disposed members, a plurality of rollers extending transversely of said ramp, a pivot shaft mounted transversely on said ramp, said pivot shaft being pivotally mounted at the free ends of said lever arms, a pair of telescoping rollers each extending transversely from said ramp in the direction of said frame members, pivot means securing one end of each of said telescoping rollers to said ramp members, a pair of rods extending in said telescoping rollers, pivot means securing one end of each of said rods to said frame members, locking means mounted on the other of said cross members engage the forward end portion of said ramp, and hand operated means for rotating said housing and swinging said lever arms rearwardly and upwardly whereby said front end of said ramp becomes released from said locking means and said ramp rises upwardly with relation to said support frame.

6. The structure as recited by claim 5 and pivoted roller means mounted on the rear end portion of said frame members, said pivoted roller means comprising a support secured to each of said frame members, a pivot arm pivotally mounted to each of said supports, a shaft mounted on the free end of each of said pivot arms at substantially its mid-portion and a roller mounted on said shafts on each side of said pivot arms.

No references cited.